May 10, 1927.  
D. B. BECKER  
JACKETED CASING  
Filed April 23, 1925    2 Sheets-Sheet 1

1,628,524

Inventor  
D. B. Becker  
By F. H. Bryant  
Attorney

May 10, 1927.  
D. B. BECKER  
JACKETED CASING  
Filed April 23, 1925   2 Sheets-Sheet 2

1,628,524

Inventor  
D. B. Becker

By F. W. Bryant  
Attorney

Patented May 10, 1927.

1,628,524

UNITED STATES PATENT OFFICE.

DEAN BROWN BECKER, OF FORT ATKINSON, WISCONSIN.

JACKETED CASING.

Application filed April 23, 1925. Serial No. 25,338.

This invention relates to improvements in casings for the rotary or rotary and reciprocating cylinders of dyeing, bleaching, soaping, scouring, and washing machines.

The primary object of the invention is to provide a casing suitable for use as the outer container for the rotary or rotary and reciprocating cylinders of dyeing, bleaching, soaping, scouring, and washing machines now in common use in knitting mills, dye houses, bleacheries, and laundries.

A further object of the invention is to provide insulating means to permit the contents of the casing to be economically heated and also for controlling the concentration, acidity, and alkalinity or chemical aspect of the same.

Other objects and advantages of the invention will be apparent during the course of the following description.

This invention embodies further improvements in the art to which it relates, and more particularly in connection with Patent No. 1,391,712, issued to D. B. Becker, on September 27, 1921.

Figure 1:
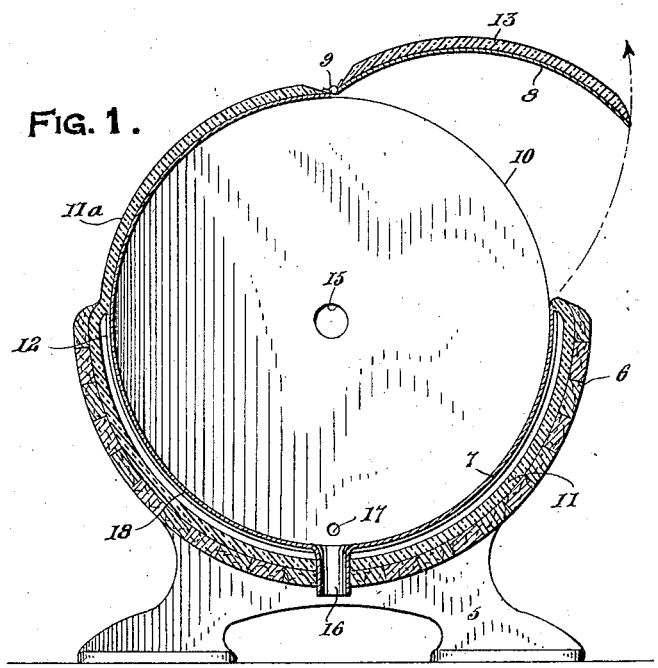
Figure 2:
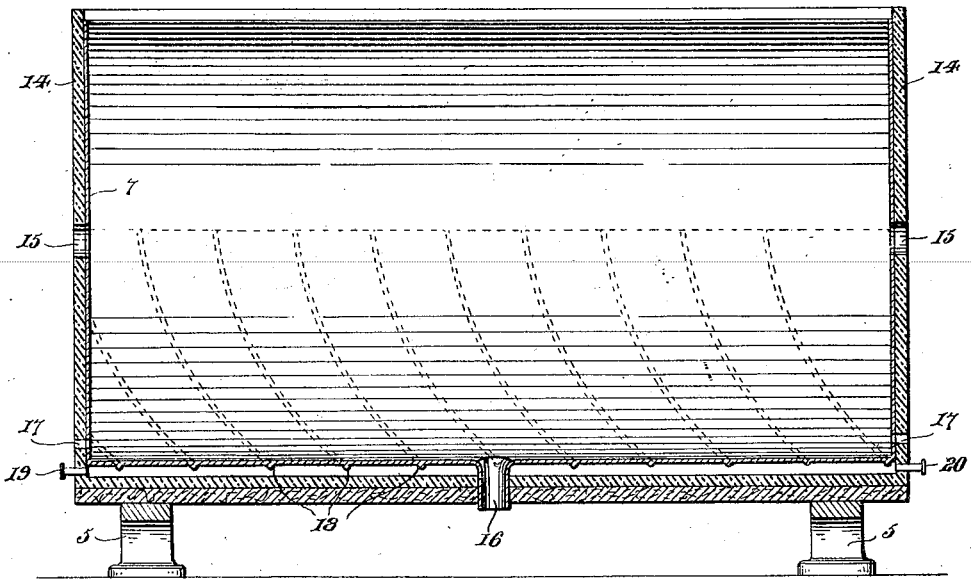
Figure 3:
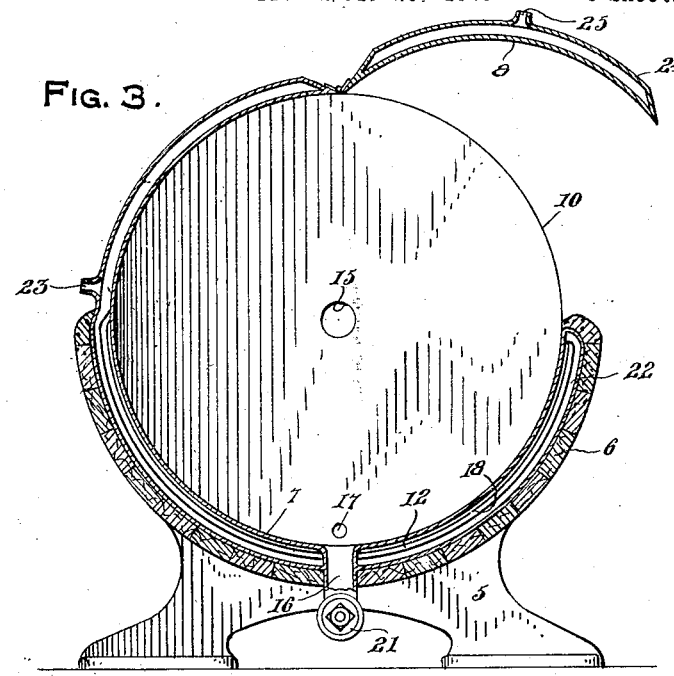
Figure 4:
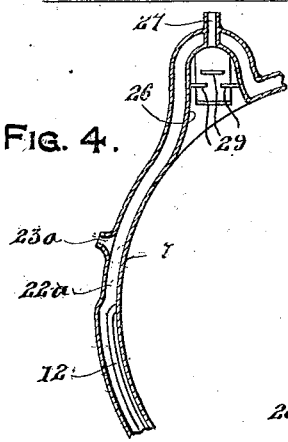
Figure 5:
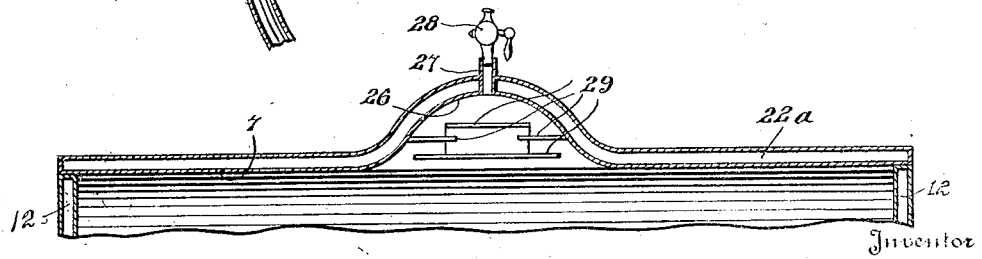

In the accompanying drawings forming a part of this specification and in which like numerals are employed to designate like parts throughout the same, Figure 1 is a transverse, vertical sectional view of one improved form of casing embodying this invention, Figure 2 is a longitudinal, vertical sectional view of the casing shown in Fig. 1, Figure 3 is a transverse, vertical sectional view of a slightly modified form of casing embodying this invention, Figure 4 is a fragmentary vertical sectional view of a further modified form of casing showing structure which will permit the drawing of a vacuum within a casing, and Figure 5 is a fragmentary vertical, longitudinal sectional view of the form of casing shown in Fig. 4.

In the drawings, wherein for the purpose of illustration is shown a preferred embodiment of this invention, the numeral 5, in Figs. 1 to 3 inclusive, designates the standards employed for supporting the casing. In these same figures the standards 5 are illustrated as having mounted thereupon the semi-cylindrically-shaped wooden or other suitable protector shell 6 which is formed from a plurality of longitudinally extending strips.

In the form of the invention shown in Figs. 1 and 2, the wooden protector shell 6 has received therein the metallic cylinder 7 having the door 8 hinged thereto at 9 for closing the opening 10. Surrounding the portion of the cylinder 7 within the wooden protector shell 6 is a layer of insulating material 11 which is slightly spaced from the metallic cylinder 7 to form a steam pressure jacket 12 therebetween. The layer of insulating material 11 is extended, as at 11$^a$ to cover the upper portion of the cylinder 7. The hingedly mounted cover 8 is also provided with an insulating covering 13, as best illustrated in Fig. 1. Fig. 2 shows the closed ends of the metallic cylinder 7 covered by layers of insulating material 14 and the steam jacket 12 may also cover the closed ends of the cylinder. The end walls of the metallic cylinder 7 and their insulating layers 14 and also the steam pressure jackets when used on the ends are formed with axially positioned openings 15 adapted for receiving stuffing boxes, not shown, which are intended to support the journals of a rotatable drum, or the like.

The lower wall of the cylinder 7 is formed with a drain 16 thru which the bleaching, soaping, scouring, dyeing, or washing bath may be removed from the cylinder. The end walls of the cylinder 7 and the insulating layers 14 and end steam pressure jacket when used are formed with openings 17 which are employed for permitting the entrance and exit of imperforate or perforated heating coils or pipes, if the same are desired for raising the temperature of the bath to be placed in the cylinder. If such heating means is not desired, these openings 17 may be closed or plugged in any desired manner.

The periphery of the metallic cylinder 7, i. e., the portion within the steam pressure jacket 12, is provided with a plurality of spirally extending ribs forming condensate ducts 18. In Fig. 2 the end layers 14 of insulating material are shown as being provided with an inlet 19 and an outlet 20 by means of which steam may be circulated thru the pressure jacket 12.

It will now be understood that by feeding steam into and out of the pressure jacket 12, the bath within the metallic cylinder 7 may be heated to any desired temperature for causing the said bath to more efficiently perform the function desired of the same. It, also, will be apparent that should the operator of this machine desire to lower the temperature of the bath within the metallic cylinder 7, a cooling medium may be circulated thru the pressure jacket 12 for accomplishing this purpose.

In Fig. 3 there is shown a slightly modified form of casing. This casing includes standards 5 for supporting the wooden protector shell 6 which has mounted therewithin the metallic cylinder 7 having the hinged door 8. The portion of this metallic cylinder 7 received within the semi-cylindrically-shaped wooden protector shell 6 is also surrounded with a steam pressure jacket 12 which has arranged therein the spirally extending condensate ducts 18, as illustrated and described in connection with Fig. 2. The cylinder outlet 16 is illustrated in this figure as being provided with a control valve 21 and it is to be understood that the drains 16, shown in Figs. 1 and 2, are to be provided with a similar control.

The improvement or modification intended to be illustrated in this figure is the provision of a jacket 22 entirely surrounding the metallic cylinder 7, and in respect to its lower portion the steam pressure jacket 12. This jacket 22 is provided with a connection 23 intended to be suitably attached to a vacuum creating pump for the purpose of permitting a vacuum to be drawn in the jacket 22. The cover 8 is, also, provided with a jacket 24 having a connection or nipple 25 formed thereon and adapted to be attached to the vacuum creating apparatus referred to in connection with the jacket 22 and connector 23. It will now be seen that the drawing of a vacuum in the jackets 22 and 24 will permit these jackets to act as a very efficient insulating means for the metallic cylinder 7.

In Figs. 4 and 5 the type of insulating means for the metallic cylinder 7, shown in Fig. 3, is used, i. e., the vacuum jacket 22ª with its nipple or connection 23ª. In these two figures, however, the metallic cylinder 7 is illustrated as having a dome 26 formed thereon and provided with a nipple or connection 27 for receiving the valve 28. The dome 26 is formed with a series of suitably arranged baffle plates 29, as illustrated.

This dome structure 26, with its nipple or connection 27, its valve 28, and its baffle plate 29, will permit the drawing of a vacuum within the metallic cylinder 7 should the same be desired.

It is to be understood that the forms of this invention herewith shown and described are to be taken as preferred examples of the same, and that various changes in the shape, size, and arrangement of parts may be resorted to without departing from the spirit of the invention or the scope of the subjoined claim.

Having thus described the invention, I claim:—

A casing of the type described, comprising a stationary horizontal cylinder of heat conducting material adapted at its ends to have an article receiving drum journaled therein and provided with a top door, a heat insulating covering on the cylinder and its door, said heat insulating covering being spaced from the lower portion of the cylinder to form a pressure jacket therebetween, and inlet and outlet connections for said jacket by means of which a cooling or a heating medium may be passed therethrough, a pair of standards, and a substantially semi-cylindrical protector shell mounted at its ends on said standards and surrounding the jacket forming portion of the heat insulating cylinder covering.

In testimony whereof I affix my signature.

DEAN BROWN BECKER.